ROTOR BRAKE

Filed March 27, 1951

INVENTOR.
Walter H. Baselt
BY
Atty.

June 19, 1956 W. H. BASELT 2,751,047
ROTOR BRAKE
Filed March 27, 1951 2 Sheets-Sheet 2
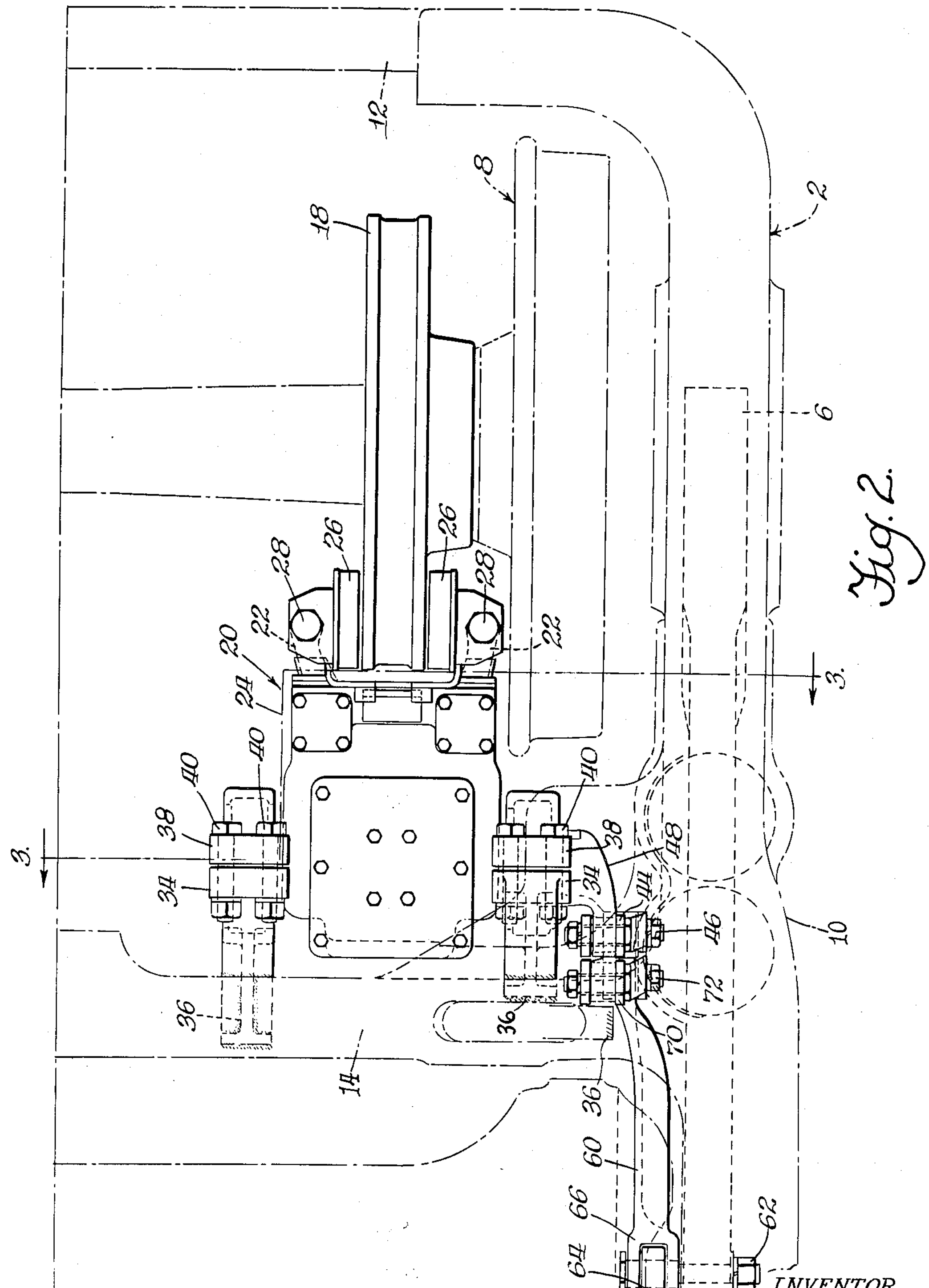

United States Patent Office 2,751,047

Patented June 19, 1956

1

2,751,047

ROTOR BRAKE

Walter H. Baselt, Flossmoor, Ill., assignor to American Steel Foundries, Chicago, Ill., a corporation of New Jersey Application March 27, 1951, Serial No. 217,833

11 Claims. (Cl. 188—59)

This invention relates to railway brakes and more particularly to a novel suspension for a rotor type brake in which friction shoes are applied to rotors mounted on the axles of a railway car truck.

A primary object of the invenion is to devise a flexible and economical torque connection between the disk brake mechanism and the truck frame.

Another object of the invention is to devise a torque connection such as above described which will reduce to a minimum forces tending to tip the truck frame relative to the wheel and axle assemblies from which it is spring supported in a conventional manner.

Another object of the invention is to compensate for the tendency of the brake shoes to move off the braked surfaces of the wheel and axle assembly as the truck frame oscillates vertically on its supporting springs, and to snub such oscillation of the frame.

A further object of the invention is to substantially eliminate transmission of braking torque forces to the wheel and axle assembly.

The foregoing and other objects and advantages of the invention will become apparent from a consideration of the following specification and the accompanying drawings, wherein:

Figure 2 is a top plan view of the structure shown in Figure 1, and

In each of said figures certain details may be omitted where more clearly seen in other views.

Figure 1:
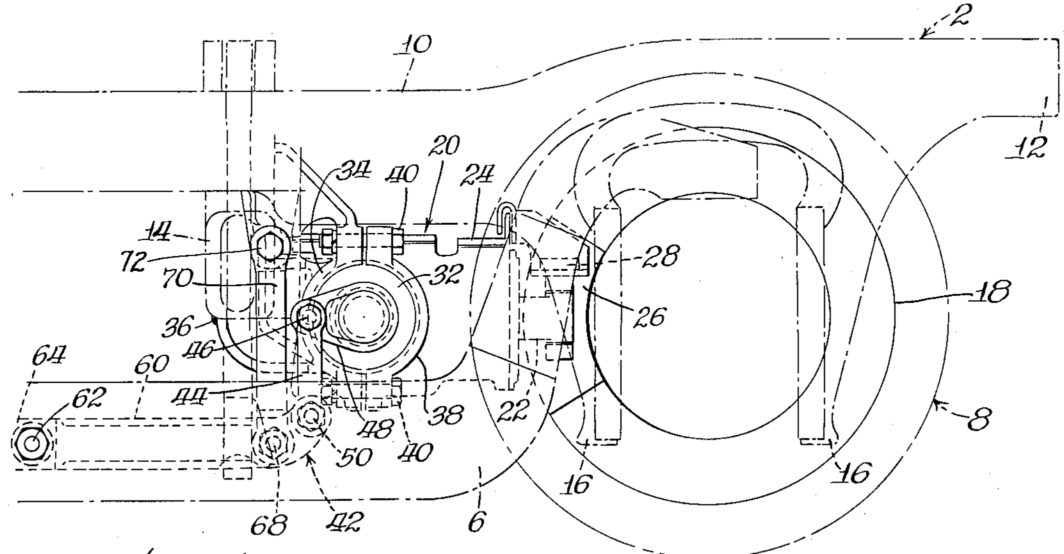
Figure 1 is a fragmentary side elevational view of a railway car truck embodying the invention.
Figure 3:
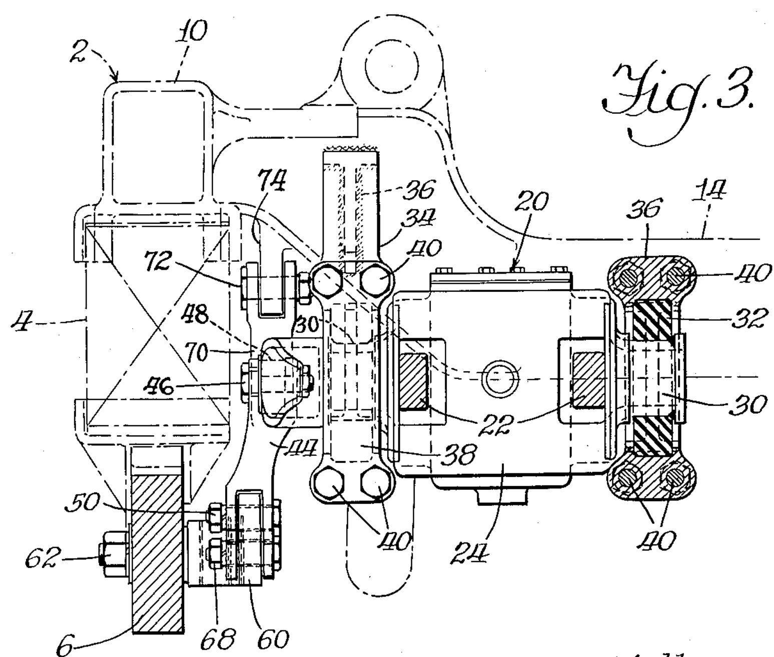
Figure 3 is a sectional view on the line 3—3 of Figure 2.

Describing the invention in detail and referring to the drawings, a sprung truck frame, generally designated 2, is supported by springs 4 (Figure 3), from an equalizer 6, extending lengthwise of the truck at each side thereof and supported in conventional manner by journal boxes (not shown) of the wheel and axle assembly, one of which is fragmentarily indicated at 8. It will be understood that only one-quarter of the truck is illustrated in Figure 2, inasmuch as the truck is of the usual conventional form and is symmetrical about its transverse and longitudinal vertical center planes.

The truck frame 2 comprises a side rail 10 at each side thereof, and an end rail 12 at each end thereof, the side rails 10 at opposite sides of the truck being interconnected by a transom 14 adjacent each end rail 12. The side rail 10 is also provided at each end thereof with depending pedestal legs 16 defining a jaw for guidable reception of the associated journal box (not shown) of the wheel and axle assembly 8 at that end of the truck.

The wheel and axle assembly 8 is also of conventional form and comprises a brake rotor 18 mounted for rotation therewith adjacent each wheel 8, said brake rotor being associated with a rotor or disk brake mechanism generally designated 20.

The mechanism 20 comprises a pair of brake levers 22 pivotally mounted in conventional manner within a casing or cylinder housing 24 which contains actuating means such as a compressed air cylinder and piston device (not shown) operatively associated with the inner ends of the brake levers 22 in the usual manner for urging brake shoes 26 into frictional engagement with opposite sides of the brake rotor or disk 18, said brake shoes being pivotally mounted as at 28 on the levers 22. It will be understood that the brake levers 22, the brake shoes 26, and the actuating means (not shown) of the brake levers constitute no part of the present invention and are preferably of the conventional design illustrated in my U. S. Letters Patent No. 2,436,136, issued on February 17, 1948, for Disk Brake for Railway Vehicles.

The inboard and outboard sides of the housing or casing 24 are provided with bearing lugs 30, each of which is rotatably mounted within a resilient bushing 32 clamped within a semi-cylindrical bracket 34 secured in any conventional manner as, for example, by welding at 36 to the truck frame transom 14. The bushing 32 is clamped within the bracket 34 by a semi-cylindrical clamping piece 38 which is adjustably secured to the bracket 34, as by bolt and nut assemblies 40.

Thus it will be understood by those skilled in the art that upon application of the brake shoes 26 to opposite sides of the brake rotor 18 during a braking operation, torque forces transmitted through the levers 22 to the casing 24 tend to rotate the latter about its bearing lugs 30, and these torque forces are transmitted to the equalizer 6 and truck frame 2 by means of a torque transmitting linkage system, generally designated 42.

The system 42 comprises a link 44 pivotally connected as at 46 to a torque arm or lever 48 integrally formed on the outboard bearing lug 30. The lower end of the link 44 is pivotally connected as at 50 to a lever 60 which is pivotally connected as at 62 to the equalizer and to a similar lever 64 operatively associated with the disk brake mechanism 20 at the opposite end of the truck. As best seen in Figure 2, the lever 60 is formed with a jaw 66 embracing the pivot end of the lever 64, however, these two levers are otherwise identical in form and function. The lever 60 is pivotally connected as at 68 to a link 70, pivotally connected as at 72 to a lug 74, depending from the adjacent transom 14.

Thus it will be understood that braking torque imposed upon the disk brake mechanism 20 is transmitted by the system 42 to the equalizer 6 and truck frame 2. Furthermore, any tendency of the brake shoes 26 to move off the braking surfaces of the rotor 18 during vertical movements of the truck frame 2 on the springs 4 is counteracted, inasmuch as downward movement of the truck frame tends to rotate the shoes upwardly about the bearings 30, and upward movement of the truck frame tends to move the shoes downwardly about the bearings 30. By means of this novel arrangement, maximum braking area between the shoes 26 and brake rotor 18 is afforded throughout vertical movement of the truck frame 2, without the necessity of anchoring the housing 24 to the wheel and axle assembly 8, as in prior art arrangements.

It may also be noted that the novel arrangement, above described, is effective to snub vertical movements of the truck frame 2 inasmuch as such movements effect rotation of the lever 48 through the system 42 and rotation of the lever 48 is frictionally resisted by the resilient bushings 32 which are snugly clamped, as above described, around the bearings lugs 30. This feature is effective to dampen oscillations of the truck frame 2 on the supporting springs 4, thereby reducing such oscillations to a minimum and preventing undesirable harmonious action.

I claim:

1. In a brake arrangement for a railway car truck having sprung and unsprung parts supported by a wheel and axle assembly with a brake surface; the combination of brake means rotatably supported by the sprung part and adapted to decelerate rotation of said surface, means for counteracting braking torque on said brake means comprising a lever system connected to both parts and to said brake means, said system being connected to said brake means independently of the connections of said system to said parts, whereby relative vertical movement of said parts rotates said brake means relative to the sprung part, actuating means for said brake means independent of said system, and means for frictionally resisting such rotation of the brake means relative to the sprung part, thereby frictionally damping relative vertical movement between the parts.

2. In a brake arrangement for a railway car truck having sprung and unsprung parts supported by a wheel and axle assembly with a brake rotor presenting a radial brake surface; the combination of brake means rotatably supported on said sprung part and engageable with said surface for decelerating rotation of said rotor, a lever system comprising a lever fulcrumed to the unsprung part, a lever fulcrumed to the sprung part and attached to said brake means, a link interconnecting the levers, and a link approximately parallel to the first mentioned link and connecting the sprung part to the first mentioned lever, and power means independent of said lever system to actuate said brake means.

3. In a railway car truck having sprung and unsprung parts supported by a wheel and axle assembly with a brake surface substantially radial to the rotational axis of said assembly; the combination of brake means for decelerating rotation of said surface, a lever fulcrumed to the sprung part for rotation on an axis approximately parallel to that of said assembly, said lever being attached to the brake means, a lever fulcrumed to the unsprung part, a link interconnecting the levers, and another link pivoted at a fixed point on the sprung part and pivoted at another fixed point on the second mentioned lever.

4. In a railway car truck having sprung and unsprung parts supported by a wheel and axle assembly; the combination of a bearing having an axis approximately parallel to that of said assembly, means on the sprung part frictionally clamping said bearing, a lever connected to the bearing, another lever connected to the unsprung part, a link interconnecting the levers and a link connecting one of the levers to the sprung part.

5. In a railway car truck having sprung and unsprung parts supported by a wheel and axle assembly; the combination of a lever, a bearing connected to the lever, means on the sprung part frictionally clamping the bearing for rotation on an axis approximately parallel to that of said assembly, a lever pivotally fulcrumed to the unsprung part on an axis approximately parallel to the first mentioned axis, a link pivotally connected to both levers, and another link pivotally connected to the sprung part and to the second mentioned lever.

6. In a railway car truck having sprung and unsprung parts supported by a wheel and axle assembly; the combination of a lever having a bearing, resilient means carried by the sprung part and frictionally clamping said bearing to resist rotation thereof, the rotational axes of the assembly and bearing being approximately parallel, and a lever system operatively connecting the lever to said parts.

7. In a railway car truck having an equalizer supported at its end by wheel and axle assemblies and having a truck frame spring supported by the equalizer; the combination of a lever having a bearing, means on the truck frame supporting and frictionally resisting rotation of said bearing, the rotational axis of the bearing and assemblies being approximately parallel, a lever fulcrumed at one end thereof to the equalizer, a substantially vertical link interconnecting corresponding ends of said levers, and another substantially vertical link interconnecting the second mentioned lever to the truck frame.

8. A railway car truck, according to claim 7, wherein brake means are fixedly attached to the first mentioned lever, and power means independent of said lever are provided for actuating said brake means to decelerate rotation of one of the assemblies.

9. In a brake arrangement for a railway car truck having sprung and unsprung parts supported by a wheel and axle assembly; the combination of brake means supported by the sprung part for decelerating rotation of said assembly, a lever system interconnecting said brake means to both parts for counteracting braking torque, and means independent of said lever system for actuating said brake means.

10. In a brake arrangement for a railway car truck having a wheel and axle assembly with a brake rotor presenting oppositely facing brake surfaces; the combination of a housing with substantially coaxial bearing lugs, means on the truck for rotatably supporting said lugs, a lever connected to one of the lugs, another lever pivoted to the truck, a link pivotally interconnecting the levers and another link pivotally connected to the truck and to one of the levers.

11. In a brake arrangement for a vehicle having sprung and unsprung parts supported by a wheel and axle assembly; the combination of levers fulcrumed to respective parts, brake means connected to one of the levers, a link interconnecting the levers, a link connecting one of the levers to the sprung part, and means independent of said levers for actuating said brake means.

References Cited in the file of this patent

UNITED STATES PATENTS

| | | |
|---|---|---|
| 2,327,157 | Tack | Aug. 17, 1943 |
| 2,382,870 | Gaenssle et al. | Apr. 14, 1945 |
| 2,416,869 | Eksergian | Mar. 4, 1947 |
| 2,416,871 | Gaenssle | Mar. 4, 1947 |